(12) United States Patent
Peretti (10) Patent No.: US 7,870,606 B2
(45) Date of Patent: *Jan. 11, 2011

(54) METHOD AND SYSTEM FOR SHADOWING ACCESSES TO REMOVABLE MEDIUM STORAGE DEVICES

(75) Inventor: Marco Peretti, Mamer (LU)

(73) Assignee: Lumension Security, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/840,516

(22) Filed: Aug. 17, 2007

(65) Prior Publication Data

US 2007/0283432 A1 Dec. 6, 2007

Related U.S. Application Data

(62) Division of application No. 09/884,921, filed on Jun. 21, 2001, now Pat. No. 7,278,158.

(60) Provisional application No. 60/276,185, filed on Mar. 16, 2001.

(51) Int. Cl.
*G06F 12/00* (2006.01)
*G06F 21/00* (2006.01)

(52) U.S. Cl. .................... 726/21; 713/193; 726/27

(58) Field of Classification Search .................. None
See application file for complete search history.

(56) References Cited

U.S. PATENT DOCUMENTS 5,799,141 A * 8/1998 Galipeau et al. .............. 714/13
5,935,244 A * 8/1999 Swamy et al. ................. 726/9
5,974,549 A * 10/1999 Golan .......................... 726/23
6,308,283 B1 * 10/2001 Galipeau et al. ............... 714/6
6,577,735 B1 * 6/2003 Bharat ......................... 380/286
6,836,657 B2 * 12/2004 Ji et al. ....................... 455/419

(Continued)

OTHER PUBLICATIONS

"SecureNT Overview", 2003, p. 1-4.*

(Continued)

*Primary Examiner*—Christopher A Revak
(74) *Attorney, Agent, or Firm*—Greenberg Traurig, LLP (57) ABSTRACT

A method and device monitor usage of external storage media. The method and system selectively shadow I/O (input/output) from/to only external storage media. The method selectively shadows only accesses to external storage media connected to a computer. The method detects a data access to an external storage medium and writes a copy of the accessed data to a storage location other than the external storage medium. In one embodiment, the access is a write operation. In one embodiment, the method intercepts an I/O request from the computer to an external storage media drive in which the external storage media is inserted. In the case of the Windows NT or Windows 2000 operating systems, the intercepted I/O requests are preferably IRP_MJ_CREATE, IRP_MJ_WRITE, IRP_MJ_CLOSE and IRP_MJ_FILE_SYSTEM_CONTROL packets. An apparatus comprises a detector and a storage connected to the detector. The detector receives I/O requests to an external storage medium. The storage is one other than the external storage medium. Written in the storage is a copy of the accessed data. In one embodiment, the apparatus further comprises one or more proxy handlers connected to the detector, wherein the proxy handlers handle certain I/O requests, which, in the case of the Windows NT or Windows NT operating system, include IRP_ MJ_CREATE, IRP_MJ_WRITE, IRP_MJ_CLOSE and IRP_MJ_FILE_SYSTEM_CONTROL packets.

4 Claims, 10 Drawing Sheets

U.S. PATENT DOCUMENTS

| | | | |
|---|---|---|---|
| 7,089,384 B2 * | 8/2006 | Tross et al. | 711/162 |
| 7,100,072 B2 * | 8/2006 | Galipeau et al. | 714/6 |
| 7,251,327 B1 * | 7/2007 | Sako et al. | 380/201 |
| 2005/0027860 A1 * | 2/2005 | Benson et al. | 709/224 |
| 2006/0253733 A1 * | 11/2006 | Galipeau et al. | 714/6 |
| 2006/1025373 | 11/2006 | Galipeau et al. | |

OTHER PUBLICATIONS

"SecureNT Overview" 2003, p. 1-4.

* cited by examiner

METHOD AND SYSTEM FOR SHADOWING ACCESSES TO REMOVABLE MEDIUM STORAGE DEVICES

RELATED APPLICATIONS

This application is a continuation-in-part of Provisional Patent Application Ser. No. 60/276,185, entitled "Input/Output Tracing," filed Mar. 16, 2001. The above-referenced application is hereby incorporated by reference.

FIELD OF THE INVENTION

This invention relates generally to computer security and more particularly to software for tracing access to external storage devices connected to a computer.

BACKGROUND OF THE INVENTION

The security of computer systems is a topic of very serious concern to almost every enterprise in today's society. Broadly speaking, there are two aspects of computer security. One aspect concerns the invasion of unwanted objects, such as viruses, from the outside world into the computer system. Infection of a computer system by a Trojan horse, for example, can disturb or disable the computer system or an application and thereby severely affect productivity. Another aspect of computer security concerns the unwanted escape of information from the computer system to the outside world. The threat of unwanted escape of information takes several forms. In one form, hackers may attempt to gain access to an enterprise's computer system so as to pilfer valuable information. In another form, disloyal employees or other "insiders" may attempt to accomplish the same end by the access that they legitimately have.

External (or removable) storage media devices are particularly vulnerable parts of a computer system. Those with access to external media storage devices on a computer system can potentially write sensitive or valuable information from the computer system to a removable media (e.g., floppy disk, writable CD (compact disc), removable hard disk drive, IOMEGA™ zip drive, etc.) and thereby escape with the information. Present attempts to deal with this type of threat are based on either external storage media device access prevention or external storage media device usage monitoring.

Physical access prevention measures have several disadvantages. For example, preventing users from using floppy disk drives altogether goes too far and significantly impedes the transfer of information, thus severely limiting the usefulness of the computer system. Another technique utilizes external storage media drives having physical locks, which a computer administrator must manually unlock to allow access to the drive. This approach provides some flexibility but at a great inconvenience. A significant advance occurs when software is utilized to control who can access external storage media and when such access can occur. Such a system is employed in the software program "SecureNT"™ available from SecureWave S.A., Luxembourg. SecureNT involves a client program that runs on each individual computer in a network and an administrator application that runs on a system administrator console. Through the administrator application, an administrator can remotely command the client programs on any of the various computers in the network to grant or revoke access to any I/O (input/output) device or interface port, including external storage media devices. SecureNT enables physical access control to be implemented electronically. In this way, access policies can be established and enforced on a simpler, consistent and centralized basis. The result is a more effective access prevention security system.

Existing measures based on monitoring usage of external media storage device are not fully effective. Example of this approach are (1) logging the names of files written to an external storage media; (2) filtering the content of files written to external storage media; and (3) combinations of the above. Ones wishing to do so can easily circumvent these measures. For example, changing the name of a file before copying it to an external storage medium defeats the first approach, and simple keyword replacement can defeat the second approach in which filtering is based on keywords in the content.

In another area of related art, storage shadowing is well known for purposes of data loss prevention. In a typical shadowing (also called "mirroring" or "mirrored") storage system, all data written to an entire disk is maintained in duplicate, usually on physically separate disks. Because the redundant shadowed or mirrored copy is kept for backup purposes, great steps are taken to ensure that the shadowed or mirrored data is complete and consistent. This type of shadowing is applied to internal or fixed disk drives rather than removable medium storage devices, because there is no pressing need to archive or mirror data written to a removable medium storage device; such data is already a copy of other data on the system.

SUMMARY OF THE INVENTION

The invention is an improved method and system for monitoring usage of external storage media. The methods and systems selectively shadow I/O (input/output) from/to only external storage media.

In one respect, the invention is a method for selectively shadowing only accesses to external storage media connected to a computer. The method detects a data access to an external storage medium and writes a copy of the accessed data to a storage location other than the external storage medium. In one embodiment, the access is a write operation. In one embodiment, the method intercepts an I/O request from the computer to an external storage media drive in which the external storage media is inserted. In the case of the Windows NT or Windows 2000 operating systems, the intercepted I/O requests are preferably IRP_MJ_CREATE, IRP_MJ_WRITE, IRP_MJ_CLOSE and IRP_MJ_FILE_SYSTEM_CONTROL packets.

In another respect, the invention is computer readable medium on which is embedded a program that performs the above method.

In yet another respect the invention is an apparatus for selectively shadowing only accesses to external storage media connected to a computer. The apparatus comprises a detector and a storage connected to the detector. The detector receives I/O requests to an external storage medium. The storage is one other than the external storage medium. Written in the storage is a copy of the accessed data. In one embodiment, the apparatus further comprises one or more proxy handlers connected to the detector, wherein the proxy handlers handle certain I/O requests, which, in the case of the Windows NT or Windows NT operating system, include IRP_ MJ_CREATE, IRP_MJ_WRITE, IRP_MJ_CLOSE and IRP_MJ_FILE_SYSTEM_CONTROL packets.

In comparison to known prior art, certain embodiments of the invention are capable of achieving certain advantages, including some or all of the following: (1) the solution is less easily circumvented than other monitoring approaches; and (2) a more complete trace of escaped information—in fact, a mirror of the information—can be produced. Those skilled in the art will appreciate these and other advantages and benefits of various embodiments of the invention upon reading the following detailed description of a preferred embodiment with reference to the below-listed drawings.

BRIEF DESCRIPTION OF THE DRAWINGS

FIGS. 2-4A are flowcharts of methods according to an embodiment of the invention;

DETAILED DESCRIPTION OF A PREFERRED EMBODIMENT

I. Individual Station System Architecture

Figure 1:
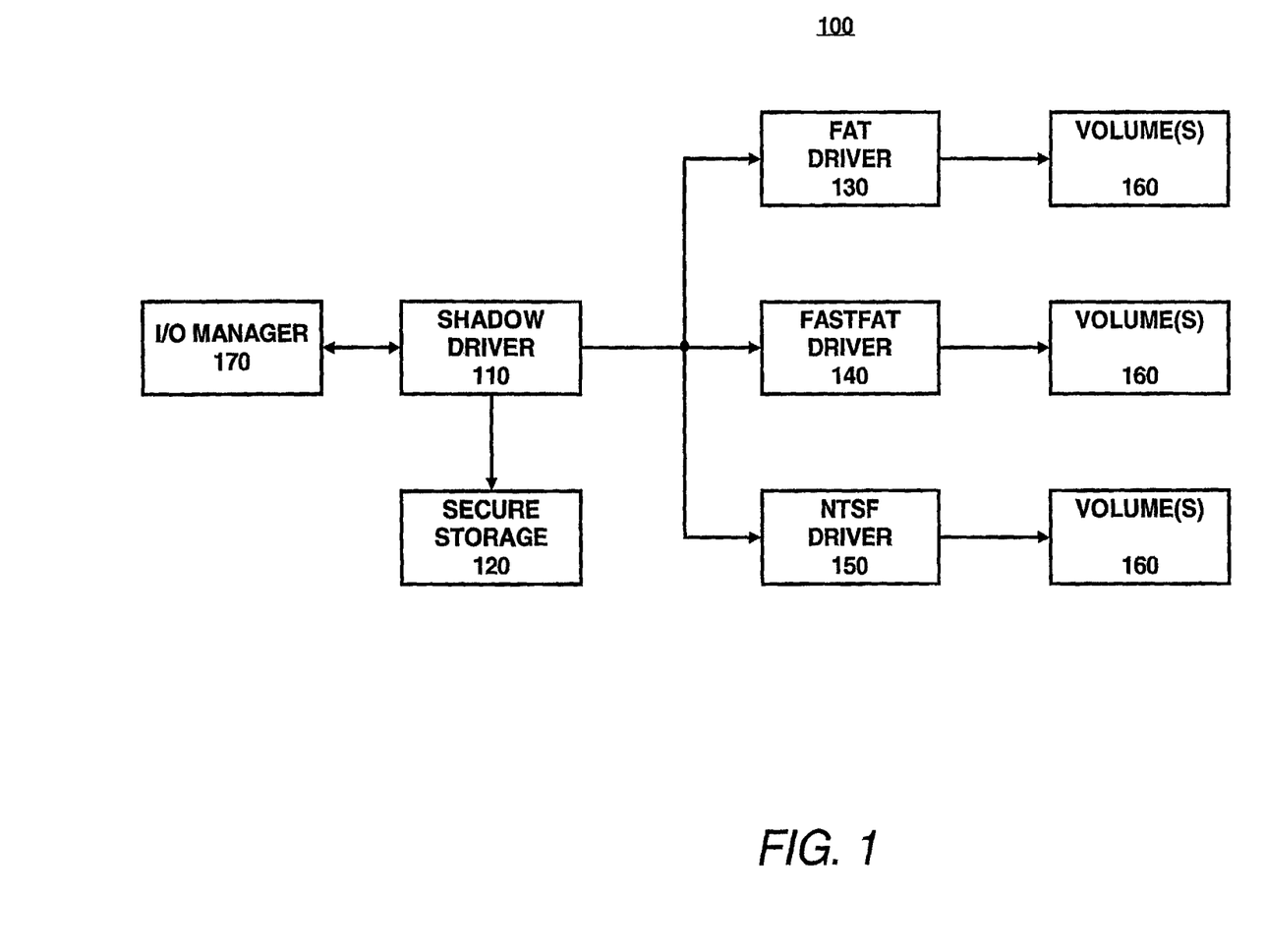
FIG. 1 is a block diagram of an individual station system architecture according to an embodiment of the invention.

FIG. 1 is a block diagram of a system architecture 100 for an individual station in a computer network, according to one embodiment of the invention running under the Windows™ operating system. The central piece of the software architecture 100 is a low level (kernel mode) shadow driver 110 preferably running under the Windows NT™ or Windows 2000™ operating systems or a VxD under Windows 9.x/ME™. (Both cases are hereinafter referred to as "the shadow driver 110".) Those skilled in the art would appreciate that the invention is not limited to these particular operating systems, but a preferred embodiment of the invention is depicted and discussed herein in the context of the Windows NT™ or Windows 2000™ operating systems to most clearly illustrate the inventive concepts.

The shadow driver 110 intercepts any and all requests to write or save data to an external storage medium and stores a copy of that data in a safe location or secure storage 120, such as a protected directory, folder or server, before allowing the data to be written or saved. The copy in the secure storage 120 is termed a "shadow" file. The secure storage 120 need not be perfectly secure, but is preferably more secure than normal.

The shadow driver 110 attaches to FAT (file allocation table) 130, FASTFAT 140 and NTFS (NT file system) 150 file system drivers and their mounted volumes 160. The shadow driver 110 essentially acts as a proxy for those file system drivers 130-150 and intercepts all IRP (I/O request packets) that are addressed to attached devices. More generally, the shadow driver 110 can intercept I/O for any other type of file systems or any interface port (e.g., serial port, parallel port, modem port). IRP packets are generated by an I/O manager 170, which, for example, is a well-known component of the Windows™ operating system.

II. Shadow Driver Algorithms and Software Architecture

Figure 2:
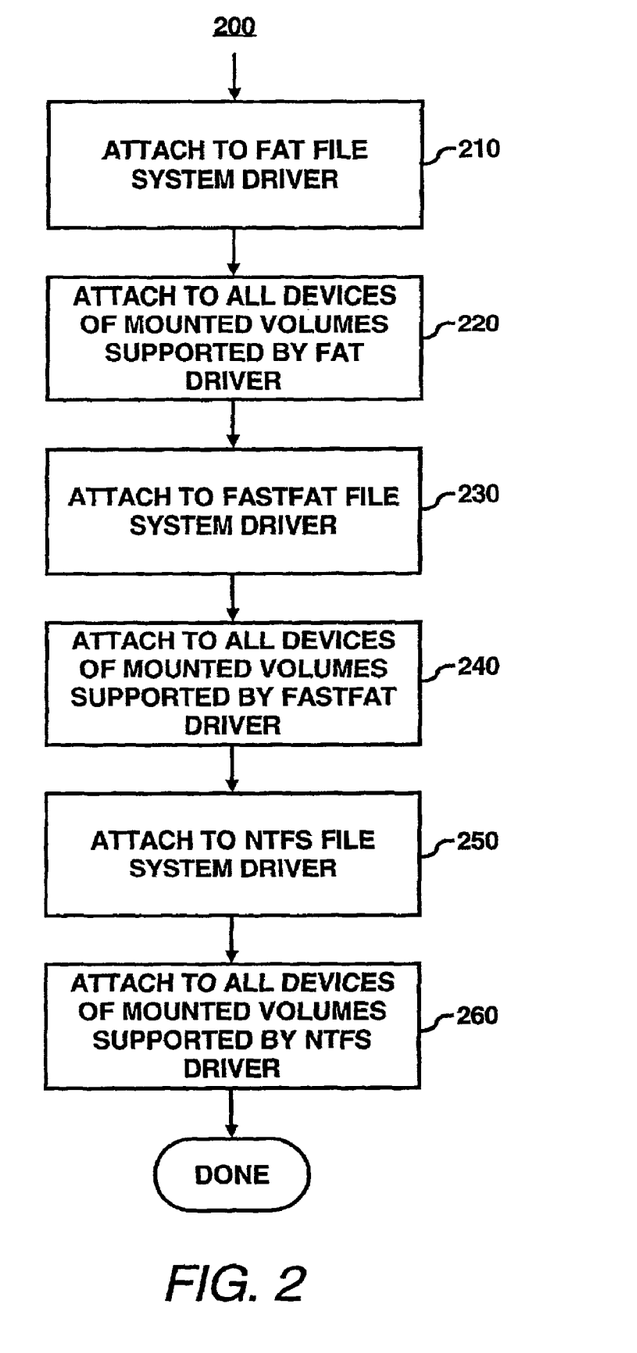

The attachment of the shadow driver 110 to the various file system drivers 130-150 and their associated volumes 160, as described above, is illustrated by an attachment method 200 in FIG. 2. The attachment method 200 attaches (210, 230, 250) to the FAT, FASTFAT and NTSF file system drivers 130-150 and attaches (220, 240, 260) to all devices of mounted volumes 160 supported by those drivers.

The shadow driver 110 intercepts all IRPs from the manager 170. The shadow driver 110 performs special handling for the following IRPs only: IRP_MJ_CREATE, IRP_MJ_WRITE, IRP_MJ_CLOSE and IRP_MJ_FILE_SYSTEM_CONTROL. Those skilled in the art understand the nature of these and other IRPs and how they are conventionally handled. Such information may be found in, for example, "Developing Windows NT Device Drivers: A Programmer's Handbook" by Edward N. Dekker and Joseph M. Newcomer, Addison-Wesley, 1999 (ISBN 0-201-69590-1), which is hereby incorporated by reference. Special handling for these four IRPs is illustrated in FIGS. 3-6, respectively. All other IRPs are redirected to the original devices for handling. The operation of these algorithms (and the attachment method 200) is preferably transparent to the user of the station 100.

Figure 3:
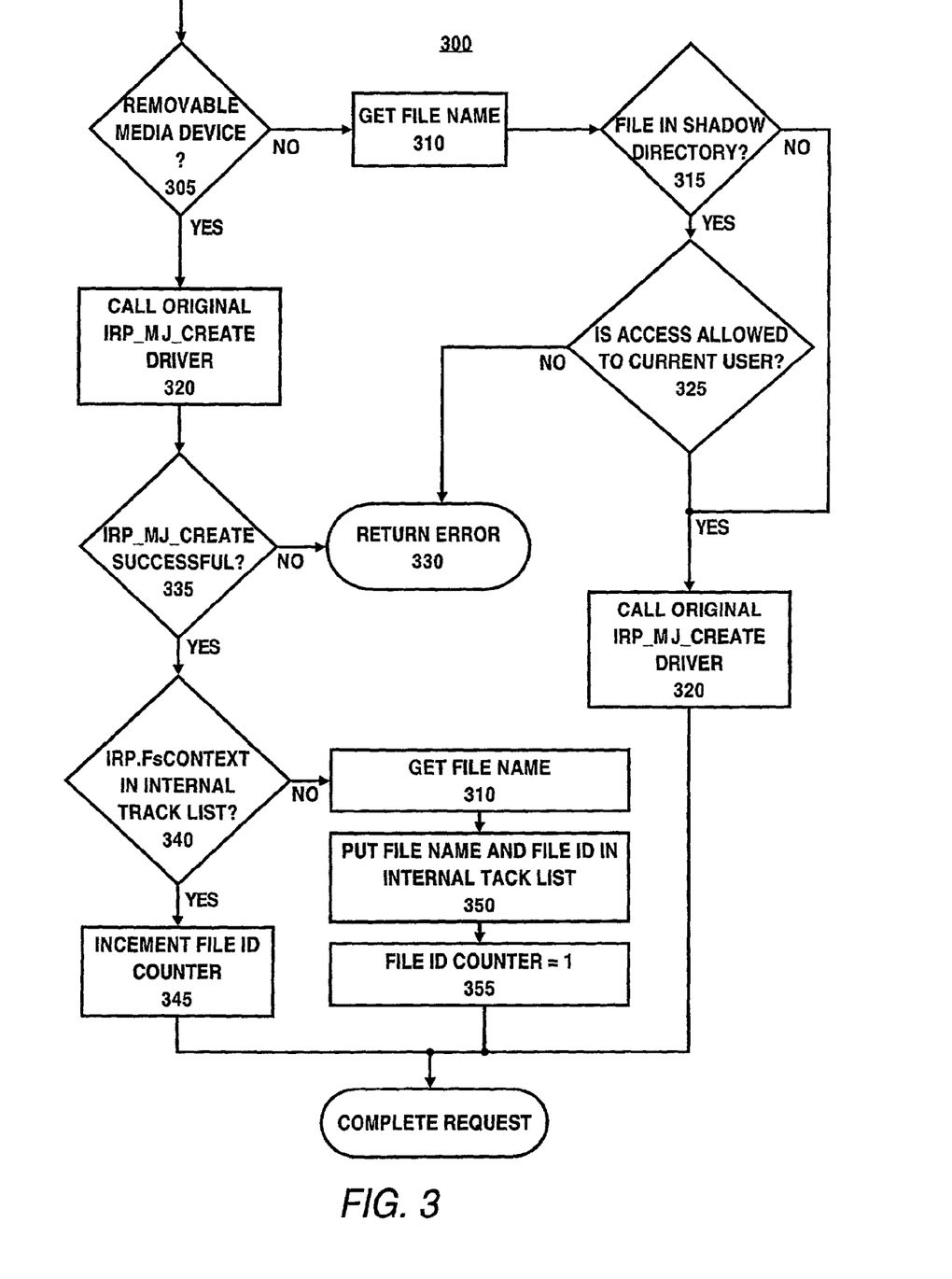

FIG. 3 illustrates a method 300 by which the shadow driver 110 handles an IRP_MJ_CREATE packet. The I/O manager 170 generates an IRP_MJ_CREATE packet whenever a new file is created or an existing file is opened. The method 300 first tests (305) whether the packet is for a removable media device. If not, the packet might refer to a shadow file. After all, shadow files are like any other files in that they are accessed using IRPs. To test this possibility, the method 300 gets (310) the file name associated with the packet and checks (315) whether the file is in the shadow directory. If it is not, then the method 300 lets the open or create operation proceed, without any further intervention, by calling (320) the original IRP_MJ_CREATE driver.

If the result of the testing step 315 is that the file referenced by the IRP_MJ_CREATE packet is a shadow file, then the method 300 determines (325) whether the current user (who caused the IRP_MJ_CREATE packet) is allowed access to the shadow directory. If not, the method 300 returns (330) an error. On the other hand, if the current user is allowed access to the shadow directory, the method 300 calls (320) the original IRP_MJ_CREATE driver.

Referring back to the testing step 305, if the packet references a removable media device, then the method 300 calls (320) the original IRP_MJ_CREATE driver, so that the file on the removal media device is created or opened. Next, the method 300 checks (335) whether the IRP_MJ_CREATE operation by the original driver was successful. If not, the method 300 returns (330) an error. If the operation was successful, the method 300 determines (340) whether the variable IRP.FsContext is in an internal track list. The variable IRP.FsContext has a unique value for each file and therefore can be used as a convenient proxy for the file name. The internal track list is a data structure created and manipulated by the shadow driver 110 to track which files are being shadowed. If the determining step 340 finds a match to IRP.FsContext in the internal track list, that indicates the file has been opened previously and not yet closed, in which case the method 300 increments (345) a file ID counter, which is used to maintain a count of how many times a file has been opened, because different applications can open the same file simultaneously.

If the determining step 340 does not find a match to IRP.FsContext in the internal track list, that indicate the file is being opened for the first time since last being closed. In this case, the method 300 retrieves (310) the file name, records (350) the file name in the internal track list and initializes (355) the file ID counter for that file to be 1.

Figure 4A:
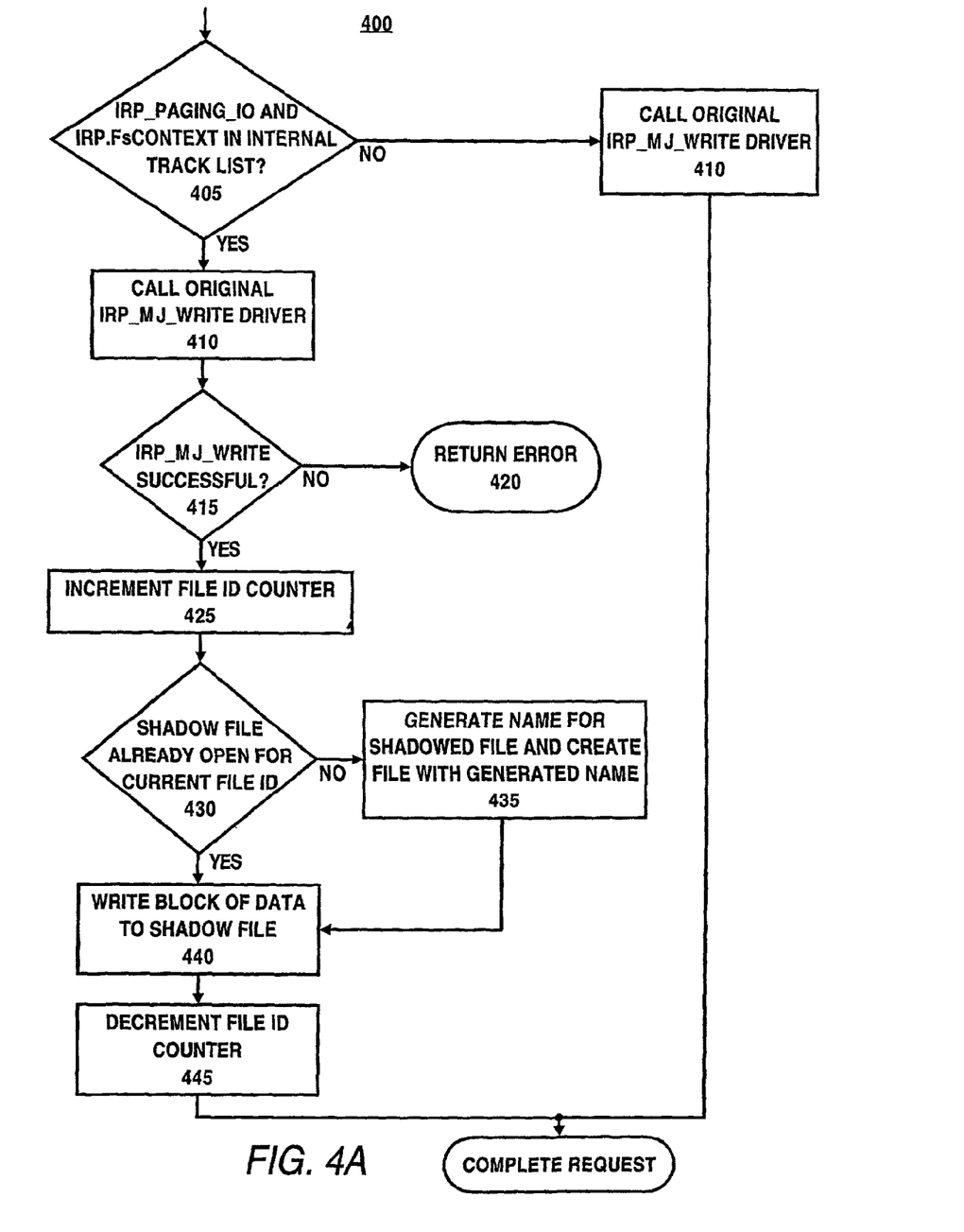

FIG. 4A illustrates a method 400 by which the shadow driver 110 handles an IRP_MJ_WRITE packet. The I/O manager 170 generates an IRP_MJ_WRITE packet whenever a file is written to. Receipt of an IRP_MJ_WRITE packet by the shadow driver 110 causes the shadow driver 110 to execute the method 400. The method 400 first checks (405) whether an IRP_PAGING_IO flag is not set and the IRP.FsContext variable is in the internal track list. The IRP_PAGING_IO flag is a binary flag that distinguishes between writes with paging and writes without paging in systems employing caching. Due to caching and paging, writes may be executed twice. Further details of operation when paging is relevant are described below, with reference to FIG. 4B. If the checking step 405 determines that either the IRP.FsContext variable is not in the internal track list or the IRP_PAGING_IO flag is set, then the write command is either not affecting a shadowed file or a duplicate of one affecting a shadowed file. Regardless, the method 400 calls (410) the original IRP_MJ_WRITE driver to let the write proceed and then terminates.

If, on the other hand, the IRP_PAGING_IO flag is set and the IRP.FsContext variable is in the internal track list, then the method 400 calls (410) the original IRP_MJ_WRITE driver and checks (415) whether the call was successful. If not successful, the method 400 returns (420) an error. If successful, the method 400 temporarily increments (425) the file ID counter and tests (430) whether a shadow file is already open for the current file ID. If not, the method 400 generates (435) a name for the shadow file and creates a file having that name before writing (435) the block of data for the IRP_MJ_WRITE packet to the shadow file. If the shadow file is already open, the method 400 simply writes (440) the data to the shadow file. After writing to the shadow file, the method 400 decrements (445) the file ID counter, undoing the incrementing step 425.

Figure 4B:
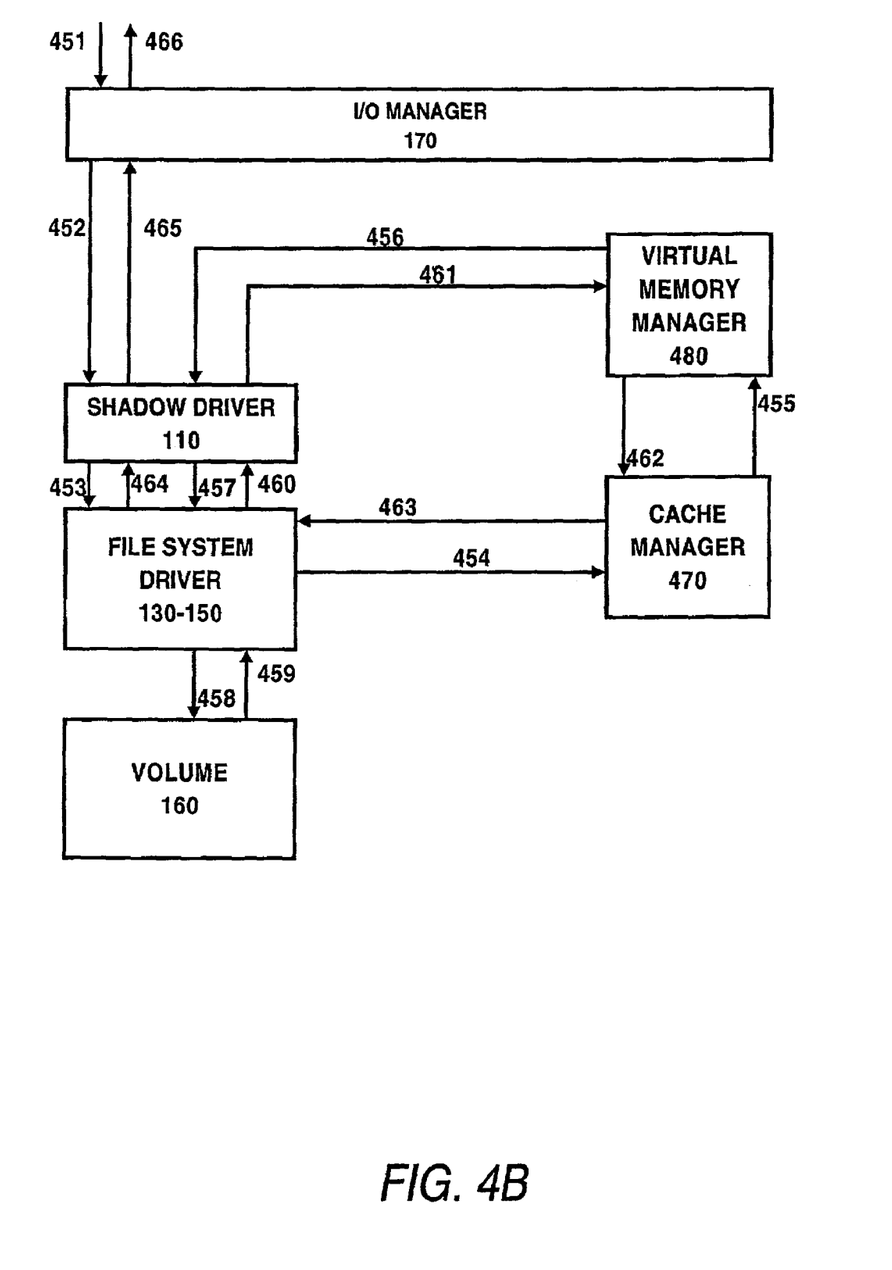
FIG. 4B is a data flow diagram according to an embodiment of the invention.

FIG. 4B is a data flow diagram that illustrates how cache paging causes two IRPs and how the shadow driver 110 handles them. The user requests a file access, at flow 451. The request is passed to the shadow driver 110, at flow 452. The shadow driver 110 forwards the request to the relevant file system driver 130, 140 or 150, at flow 453. The relevant file system driver 130, 140 or 150 requests the data from a cache manager 470, at flow 454. The cache manager 470 is a well known component of the Windows NT™ operating system, for example. If the cache manager 470 has the data (cache hit), it returns the data, at flow 463; if not, the cache manager 470 requests a virtual memory manager 480 to read the data, at flow 455. The virtual memory manager 480 is another well known component of the Windows NT™ operating system, for example. The virtual memory manager 480 forwards the request with the IRP_PAGING_IO flag set, at flow 456. The shadow driver 110 detects the IRP_PAGING_IO flag is set and passes the request to the relevant file system driver 130, 140 or 150, at flow 457. The relevant file system driver 130, 140 or 150 detects the IRP_PAGING_IO flag is set and accesses the volume 160, which returns the data, at flows 458-459. The relevant file system driver 130, 140 or 150 then returns the data, at flow 460, and the data is passed to the virtual memory manager 480, at flow 461, which passes it to the cache manager 470, at flow 462. The cache manager 470 completes the request and passes the data to the relevant file system driver 130, 140 or 150, at flow 463, which passes the data back to the shadow driver 110, at flow 464, which in turn passes the data back to the I/O manager 170 and then the user, at flows 465-466.

Figure 5:
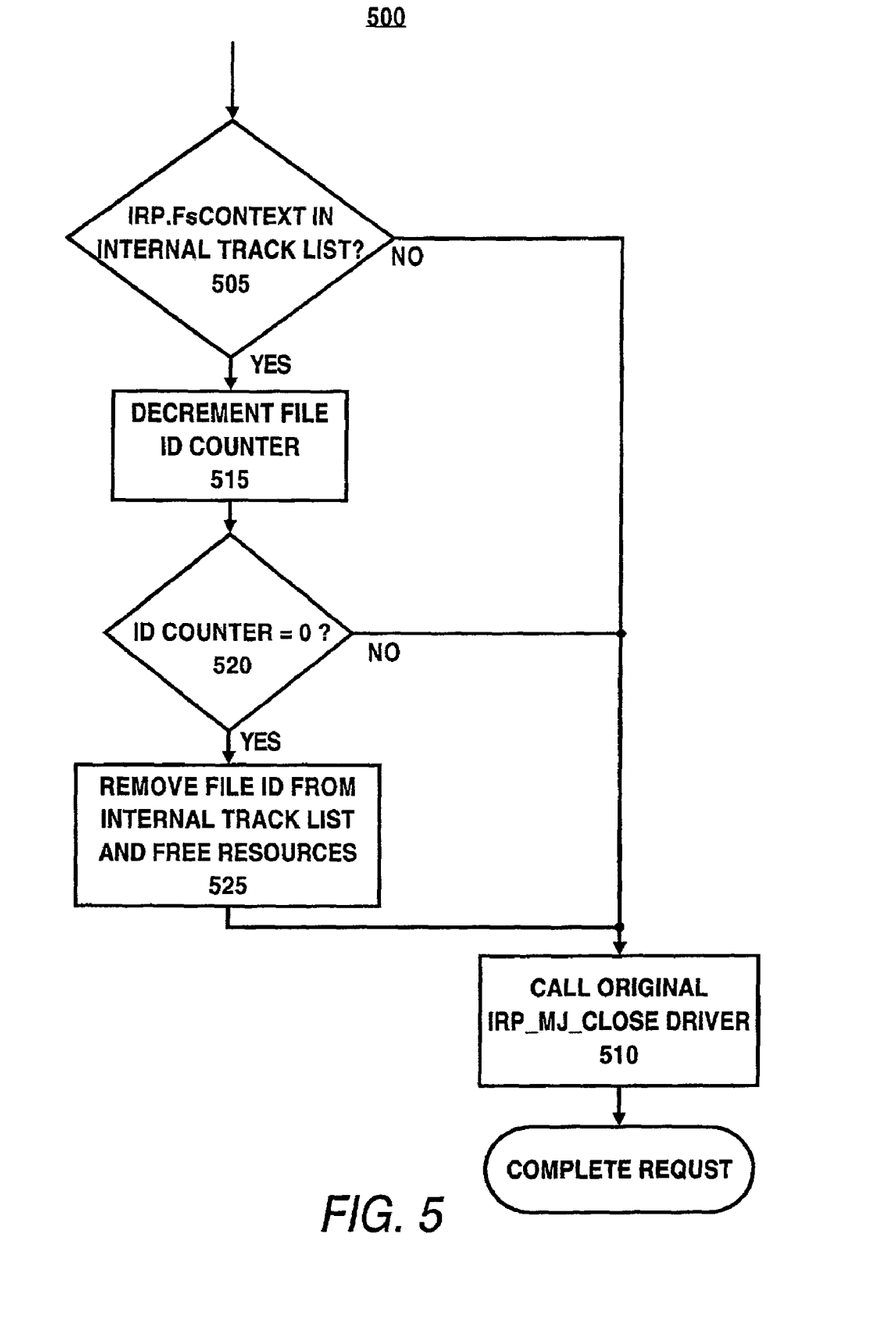
FIGS. 5-7 are flowcharts of methods according to an embodiment of the invention.

FIG. 5 illustrates a method 500 by which the shadow driver 110 handles an IRP_MJ_CLOSE packet. The I/O manager 170 generates an IRP_MJ_CLOSE packet whenever a file is closed. In response, the shadow driver 110 executes the method 500, which first checks (505) whether the IRP.FsContext for the packet is in the internal track list. If not, the packet is closing an unshadowed file and the method 500 simply calls (510) the original IRP_MJ_CLOSE driver to let that proceed. However, if the IRP.FsContext value is in the internal track list, then the method decrements (515) the file ID counter and tests (520) that counter is 0. Recall that the method 300 increments the file ID counter every time the file is opened. When ID file counter=0, the file is not open at all and the method 500 removes (525) the file ID from the internal track list and frees resources associated with that entry in the list. Finally, the method 500 calls (510) the original IRP_MJ_CLOSE driver to effectuate the closing operation.

Figure 6:
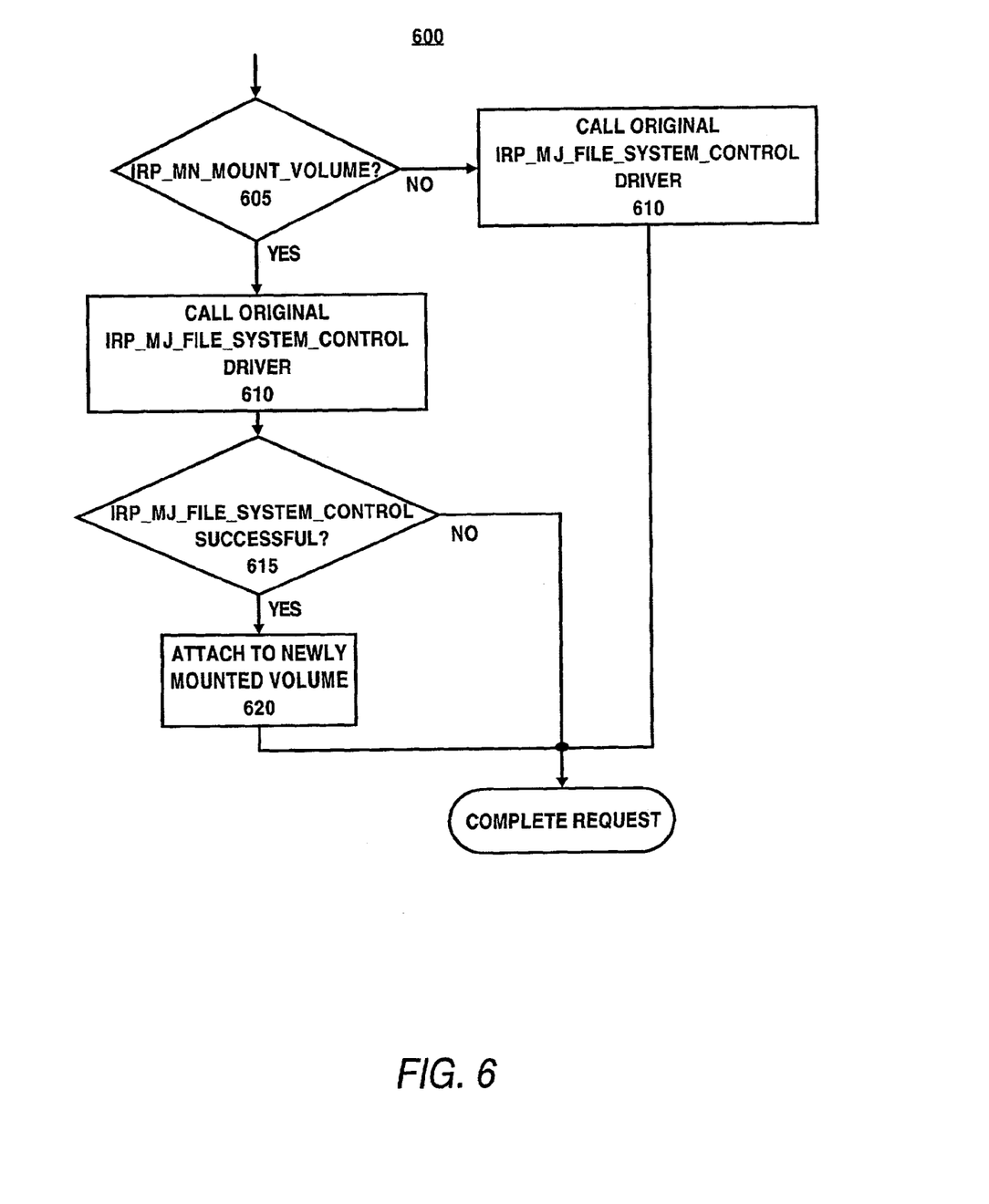

FIG. 6 illustrates a method 600 by which the shadow driver 110 handles an IRP_MJ_FILE_SYSTEM_CONTROL packet. The I/O manager 170 generates IRP_MJ_FILE_SYSTEM_CONTROL packets for various control operations. When such a packet is detected by the shadow driver 110, it executes the method 600. The method 600 begins by checking (605) whether a command code IRP_MN_MOUNT_VOLUME is set to a minor state. This command code is set in an IRP_MJ_FILE_SYSTEM_CONTROL packet when a new medium is inserted in a removable media device. For example, inserting a new floppy disk into a floppy disk drive causes an IRP_MJ_FILE_SYSTEM_CONTROL packet to be generated with the IRP_MN_MOUNT_VOLUME command code set as "minor." If this command code is not set in the minor state, the method 600 simply calls (610) the original IRP_MJ_FILE_SYSTEM_CONTROL driver. If the flag is set, the method 600 calls (610) the original IRP_MJ_FILE_SYSTEM_CONTROL driver and tests (615) whether the call was successfully executed. If so, the method 600 attaches (620) to the newly mounted volume.

Figure 7:
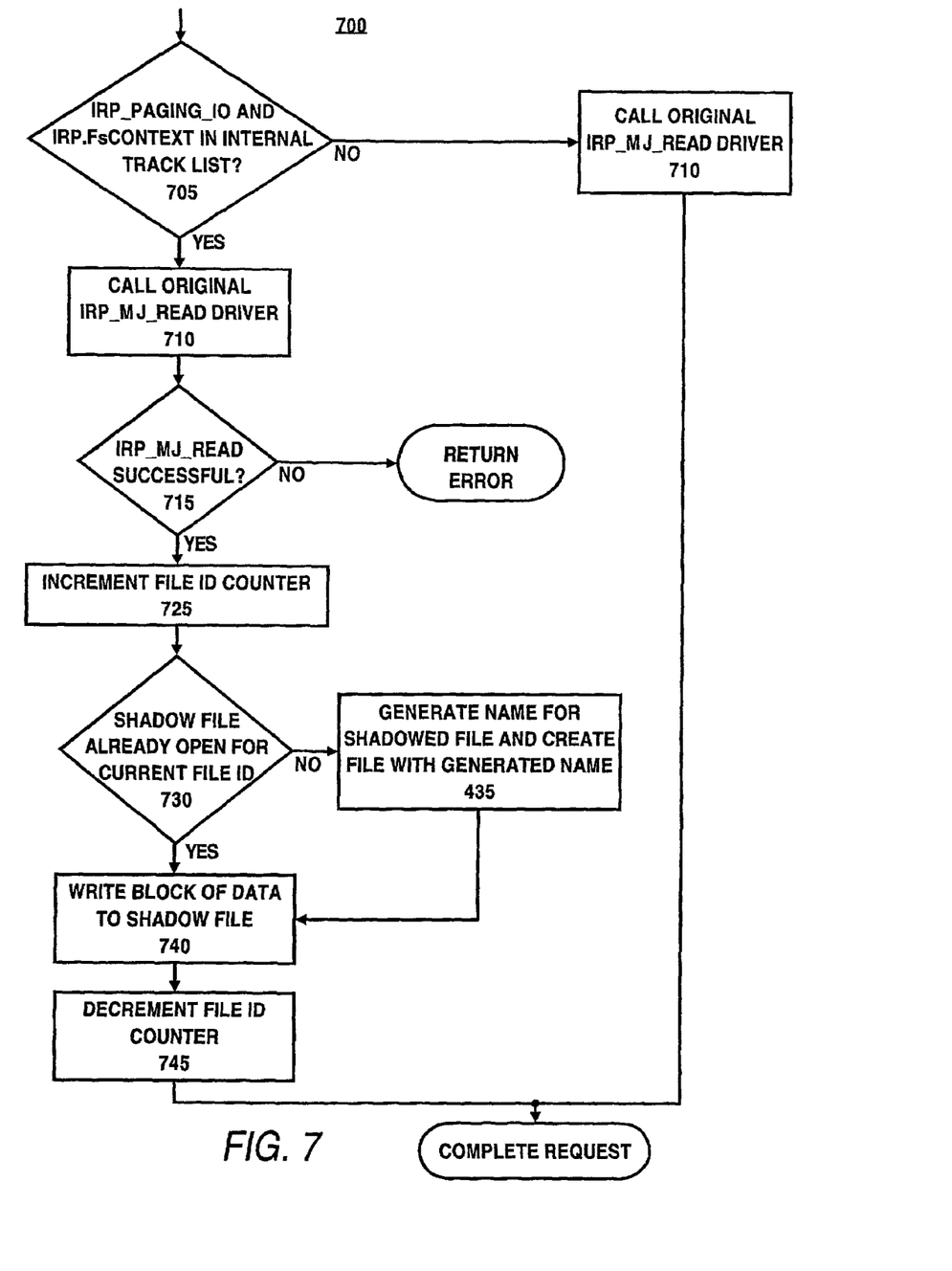

What has been described to this point are algorithms for shadowing files written to removable media devices. More generally, the invention may shadow other accesses to removable media devices. For example, the method 400 for handling IRP_MJ_WRITE packets can be replaced by or supplemented with a method for handling IRP_MJ_READ packets, so as to shadow files read from removable media devices. Such a method is illustrated in FIG. 7. FIG. 7 illustrates a method 700 by which the shadow driver 110 handles an IRP_MJ_READ packet. The I/O manager 170 generates an IRP_MJ_READ packet when a file is read. Receipt of an IRP_MJ_READ by the shadow driver 110 causes the shadow driver 110 to execute the method 700, if read shadowing is supported. The method 700 is similar to the method 400, except that the calling step 710, unlike the calling step 410, calls the original IRP_MJ_READ driver.

Figure 8:
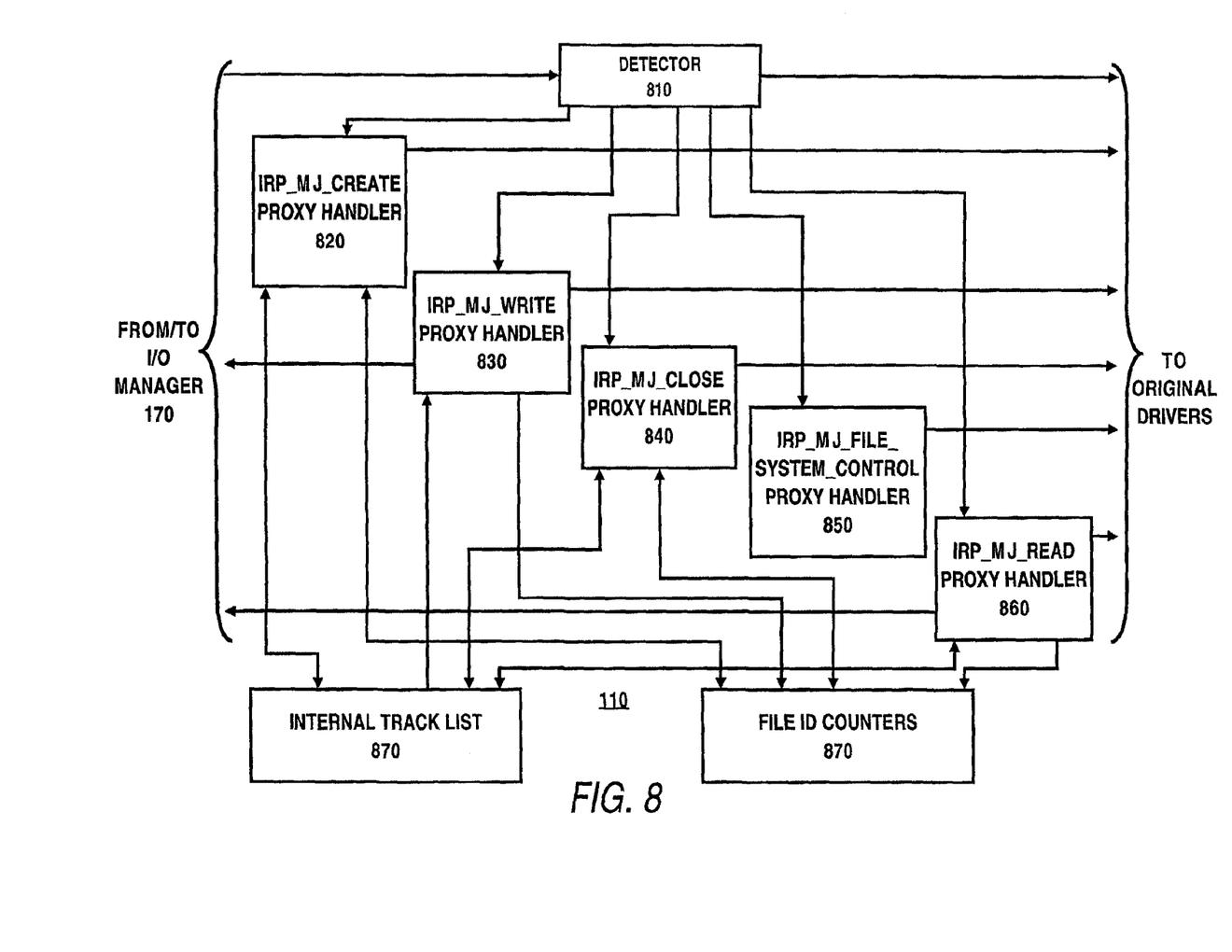
FIG. 8 is a block diagram of a software architecture of the shadow driver from FIG. 1, according to an embodiment of the invention.

FIG. 8 is a block diagram of a software architecture of the shadow driver 110, according to one embodiment of the invention. The shadow driver 110 comprises a detector 810, which detects those IRPs that are to be handled specially. All other IRPs are passed directly to their original drivers. Upon receipt of an IRP requiring special handling, the detector invokes one of a set of proxy handlers 820-860, which handle IRP_MJ_CREATE, IRP_MJ_WRITE, IRP_MJ_CLOSE, IRP_MJ_FILE_SYSTEM_CONTROL, and IRP_MJ_READ packets, respectively. The proxy handlers 820-860 call the original drivers, as indicated in the figure. The IRP_MJ_WRITE and IRP_MJ_READ proxy handlers 830 and 860 also send commands back to the I/O manager 170 to write to and read from the shadow files in the secure storage 120. The proxy handlers 820-860 also interact with an internal track list 870 and file ID counters 880, as shown in the figure and described in more detail in the foregoing flowcharts.

The secure storage 120 is preferably organized as in a hierarchical arrangement of directories or folders. In one preferred arrangement, a "shadow" directory is subdivided by date, each date having its own subdirectory. Within each date subdirectory are stored the shadow files accessed on that date.

The shadow files are preferably timestamped. A subdirectory may be further subdivided by user, station, time interval, type of file, etc.

III. Uses of Shadowed Files

Figure 9:
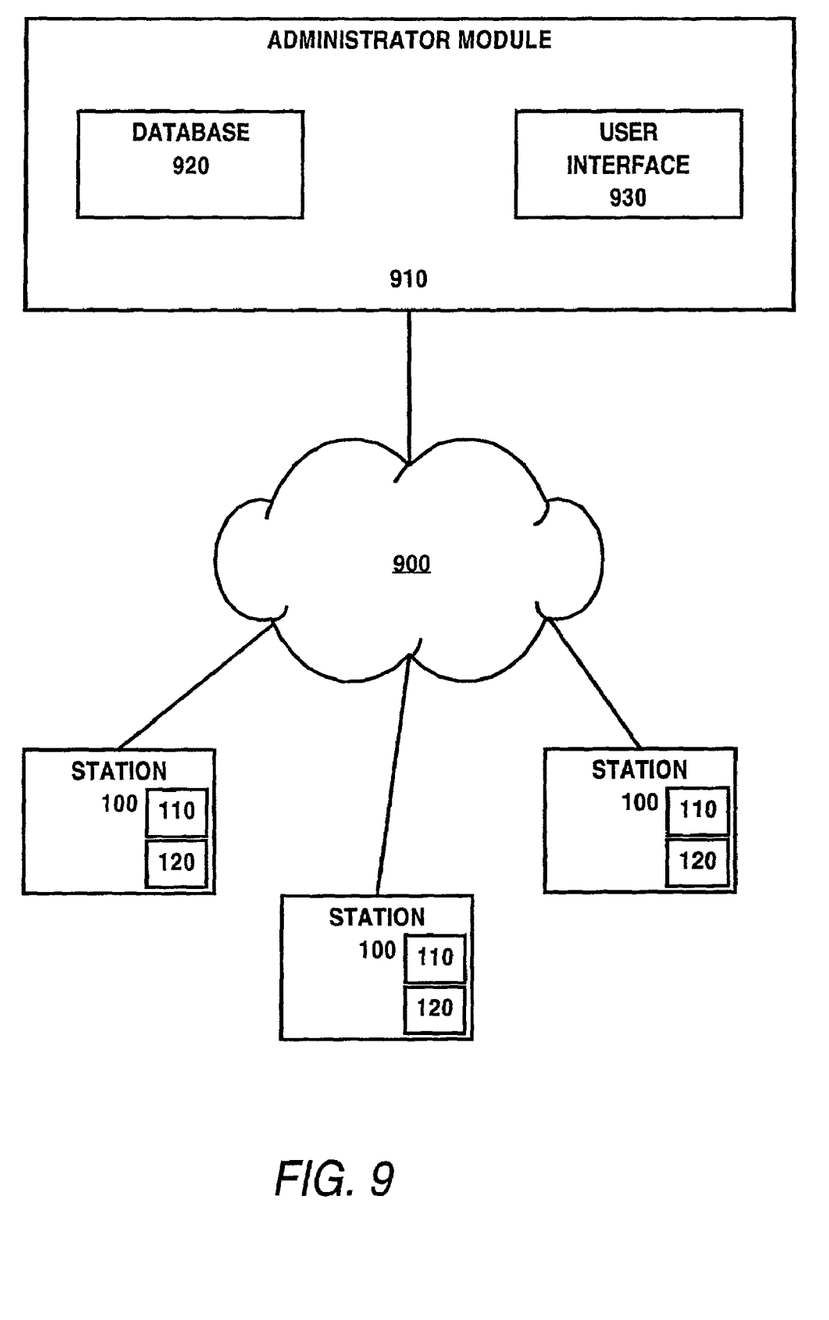
FIG. 9 is a block diagram of a computer network according to an embodiment of the invention.

Addition of an administrator module to the station 100 or another node of a computer network on which the station 100 is a part enables tracing of escaping data via the shadow files in the secure storage(s) 120. An example of such a administrator module in a network environment is illustrated in FIG. 9. FIG. 9 is a block diagram of a computer network 900 according to an embodiment of the invention. Attached to the computer network 900 is an administrator module 910 connected to multiple stations 100 across the network 900. A user with enhanced privileges, such as a system administrator, typically runs the administrator module 910. The administrator module 910 comprises a database 920 and a user interface 930.

A system administrator can initiate a scan of the shadow files across the network 900 by commanding the administrator module 910 to fetch the contents of the secure storage 120 in each station 100 and to archive the same in the database 920. Preferably, each record of the database 920 contains one or more file names associated with the copied information, an identification of who initiated the access to the data, a station ID where the access occurred, and a timestamp of when the access occurred, in addition to the copied data itself. The administrator can then query the database 920 to trace the escaped information. Such queries can be by file, user, station, time or any other desired criteria.

One embodiment of the administrator module 910 is the "NetScan" plugin module of the SecureNT program from SecureWave, referenced above. The features of NetScan from the user's perspective are described and the user interface 930 is illustrated in the SecureNT Version 1.3 User Guide, document version 1.0, March 2000, pp. 3.1-3.11, which is hereby incorporated by reference and repeated in pertinent part on the following pages.

IV. Different Forms of the Invention

The algorithms illustrated in FIGS. 2-7 and the software modules illustrated in FIGS. 1, 8 and 9 can exist in a variety of forms both active and inactive. For example, they can exist as software program(s) comprised of program instructions in source code, object code, executable code or other formats. Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the graphics display classes, their extensions or document-producing programs on a CD ROM or via Internet download. In a sense, the Internet itself, as an abstract entity, is a computer readable medium. The same is true of computer networks in general.

V. Conclusion

What has been described and illustrated herein is a preferred embodiment of the invention along with some of its variations. The terms, descriptions and figures used herein are set forth by way of illustration only and are not meant as limitations. For example, to enable tracing of data input to a computer system, the invention can be applied to data read from external storage media, in a manner analogous to written data. Those skilled in the art will recognize that this and many other variations are possible within the spirit and scope of the invention, which is intended to be defined by the following claims—and their equivalents—in which all terms are meant in their broadest reasonable sense unless otherwise indicated.

What is claimed is:

1. A method comprising:
    detecting a data access from a computer to an external storage medium, wherein the external storage medium is locally connected to the computer;
    writing a copy of the accessed data to a storage location other than the external storage medium;
    intercepting an I/O request from the computer to an external storage media drive in which the external storage medium is inserted; and
    associating tracking information about the accessed data with the copy of the accessed data, wherein the tracking information comprises a combination of one or more of the following: user, station, time, and type of file.

2. A method comprising:
    detecting a data access from a computer to an external storage medium, wherein the external storage medium is locally connected to the computer;
    writing a copy of the accessed data to a storage location other than the external storage medium, wherein the storage location other than the external storage medium is a protected storage location; and
    associating tracking information about the accessed data with the copy of the accessed data, wherein the tracking information comprises a combination of one or more of the following: user, station, time, and type of file.

3. A non-transitory computer readable storage medium on which is embedded computer software, the software performing a method, the method comprising:
    detecting a data access from a computer to an external storage medium, wherein the external storage medium is locally connected to the computer;
    writing a copy of the accessed data to a storage location other than the external storage medium;
    intercepting an I/O request from the computer to an external storage media drive in which the external storage medium is inserted; and
    associating tracking information about the accessed data with the copy of the accessed data, wherein the tracking information comprises a combination of one or more of the following: user, station, time, and type of file.

4. An apparatus comprising:
    a detector that receives I/O requests from a computer to an external storage medium, wherein the external storage medium is locally connected to the computer;
    a storage, other than the external storage medium, connected to the detector, in which are written: a copy of the accessed data and tracking information about the accessed data, wherein the tracking information comprises a combination of one or more of the following: user, station, time, and type of file; and
    one or more proxy handlers connected to the detector, wherein the proxy handlers handle certain of the I/O requests.

* * * * *